United States Patent
Stojkovic et al.

(10) Patent No.: US 11,066,111 B2
(45) Date of Patent: Jul. 20, 2021

(54) ARTICULATING TAILGATE

(71) Applicant: Ford Global Technologies, LLC, Dearborn, MI (US)

(72) Inventors: Dragan B. Stojkovic, Taylor, MI (US); Steven William Gallagher, Bloomfield Hills, MI (US); Shawn Michael Morgans, Chelsea, MI (US); Jack Marchlewski, Saline, MI (US); Joshua Robert Hemphill, White Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 76 days.

(21) Appl. No.: 16/702,982

(22) Filed: Dec. 4, 2019

(65) Prior Publication Data
US 2021/0171128 A1 Jun. 10, 2021

(51) Int. Cl.
*B62D 33/03* (2006.01)
*B62D 33/027* (2006.01)
*B60J 5/10* (2006.01)

(52) U.S. Cl.
CPC .............. *B62D 33/03* (2013.01); *B60J 5/108* (2013.01); *B62D 33/0273* (2013.01)

(58) Field of Classification Search
CPC .......................... B62D 33/023; B62D 33/027; B62D 33/0273; B62D 33/03; B60J 5/108
USPC ....................................................... 296/57.1
See application file for complete search history.

(56) References Cited

U.S. PATENT DOCUMENTS

| | | | |
|---|---|---|---|
| 2,151,335 A | 3/1939 | Rush | |
| 7,232,173 B2* | 6/2007 | Katterloher | B60R 3/02 296/50 |
| 7,234,750 B1 | 6/2007 | Doolittle et al. | |
| 10,081,303 B1* | 9/2018 | Ngo | B62D 33/0273 |
| 2001/0004155 A1* | 6/2001 | Decker | B60J 5/12 296/57.1 |
| 2002/0074818 A1* | 6/2002 | Presley | B62D 33/0273 296/57.1 |
| 2004/0227368 A1* | 11/2004 | Seksaria | B62D 33/0273 296/26.1 |
| 2007/0284904 A1* | 12/2007 | Carvalho | B60P 1/431 296/57.1 |
| 2008/0079283 A1 | 4/2008 | Jeon | |
| 2008/0111390 A1 | 5/2008 | Smith | |
| 2008/0277958 A1* | 11/2008 | King | B62D 33/0273 296/39.2 |
| 2009/0243329 A1* | 10/2009 | Hustyi | B60J 5/103 296/76 |
| 2011/0163565 A1* | 7/2011 | Zielinsky | B62D 33/0273 296/57.1 |
| 2011/0181068 A1* | 7/2011 | Zielinsky | B60P 1/26 296/57.1 |
| 2012/0126564 A1* | 5/2012 | Hausler | B62D 33/0273 296/62 |
| 2012/0256444 A1* | 10/2012 | Thurmon | B60N 2/36 296/182.1 |

(Continued)

*Primary Examiner* — Gregrory A Blankenship
(74) *Attorney, Agent, or Firm* — David Coppiellie; Carlson, Gaskey & Olds, P.C.

(57) ABSTRACT

A tailgate assembly for a vehicle includes hinge and track assemblies that enable opening of the tailgate from a closed position to a horizontal open position and further to a vertical open position to enable comfortable access to items within the cargo bed.

15 Claims, 7 Drawing Sheets

(56) References Cited

U.S. PATENT DOCUMENTS

| | | |
|---|---|---|
| 2017/0166265 A1 | 6/2017 | Estrada |
| 2019/0054961 A1* | 2/2019 | Ngo .......................... B60R 3/00 |
| 2019/0389388 A1* | 12/2019 | Ngo .......................... B60R 3/02 |
| 2020/0148283 A1* | 5/2020 | Robinson ............... B62D 33/03 |

* cited by examiner

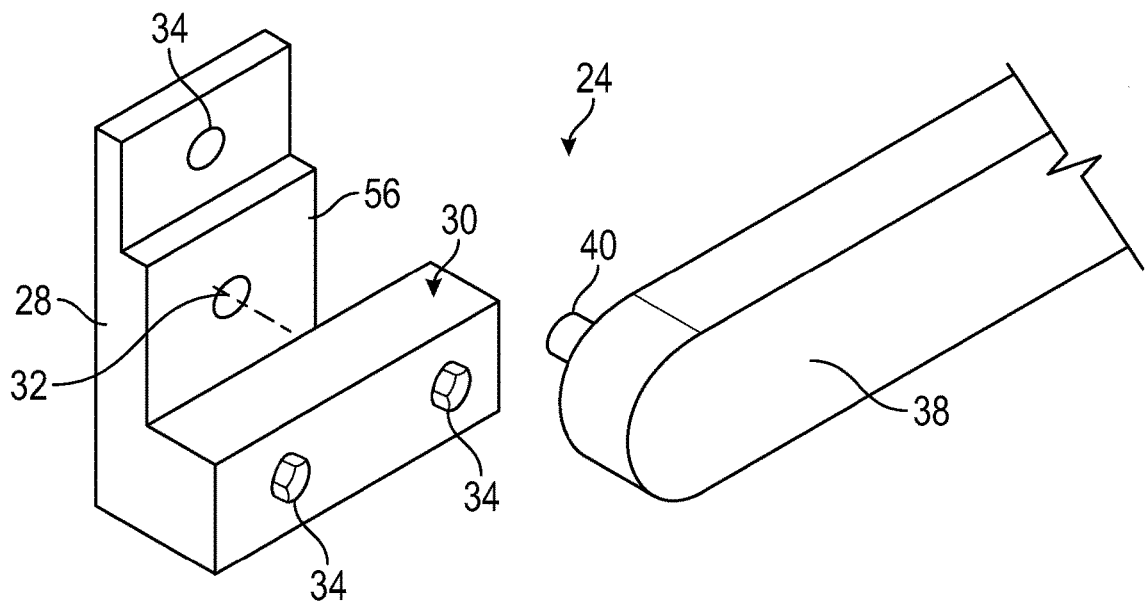
FIG. 4
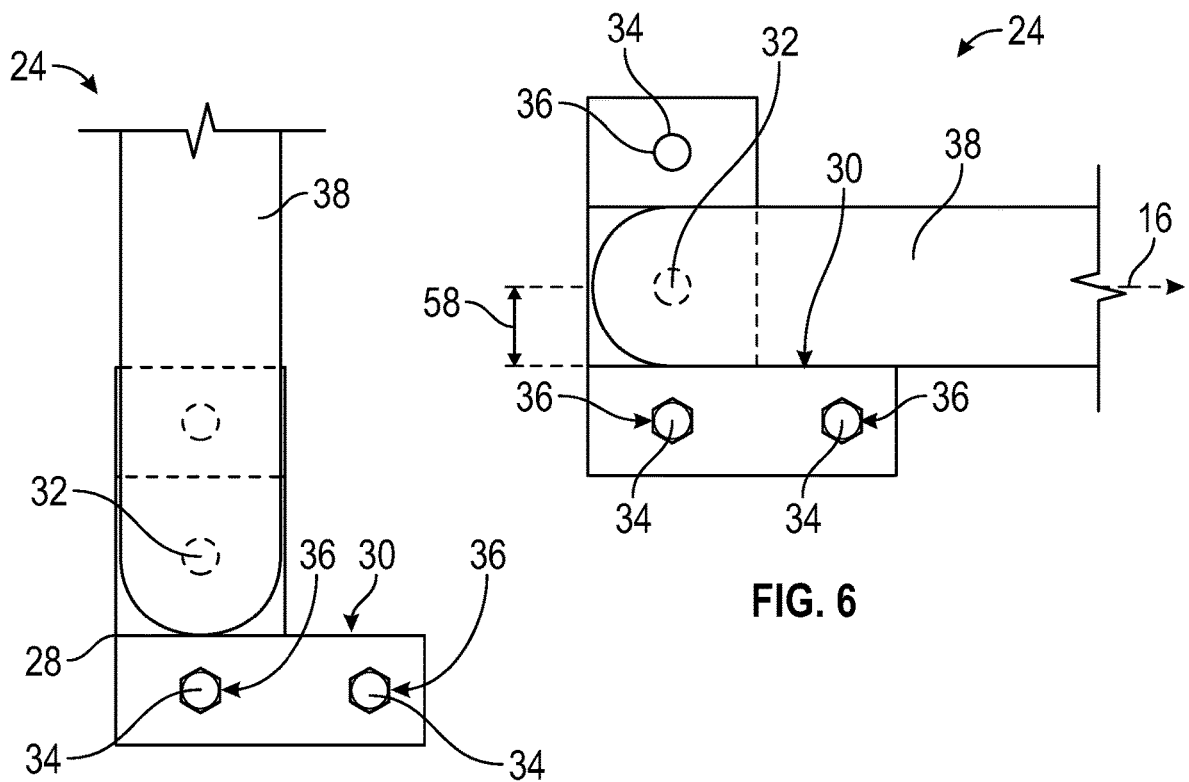
FIG. 5
FIG. 6

ARTICULATING TAILGATE

TECHNICAL FIELD

This disclosure relates to a tailgate for a pickup truck that is openable to a vertical open position.

BACKGROUND

Tailgates for a pickup truck are openable to a horizontal positon to enable access to a cargo bed. The tailgate extends outward from the cargo bed in the horizontal positon such that an operator is required to reach of the tailgate to access items within the cargo bed.

SUMMARY

A tailgate assembly for a vehicle according to an exemplary aspect of the present disclosure includes, among other things, a tailgate, a track assembly including a first link attached to a second link at a link pivot and a track member slidable over the first link, the second link and the link pivot, wherein the tailgate is attached to the track member and the track member is slidable from the first link to the second link to enable movement of the second link relative to the first link about the link pivot and a hinge attached to a static structure of the vehicle and the first link of the track assembly at a hinge pivot such that the first link and the tailgate is movable about the hinge pivot between a closed position and a horizontal position and further movable about the link pivot to a vertical open position.

In a further non-limiting embodiment of the foregoing tailgate assembly, the track member is slidable from a first position that secures the second link parallel to the first link to a second position that enables the second link to move to the vertical open position that is transverse to the first link.

In a further non-limiting embodiment of any of the foregoing tailgate assemblies, the track member includes a channel and the first link and the second link are disposed within the channel.

In a further non-limiting embodiment of any of the foregoing tailgate assemblies, the track member extends over the link pivot when the tailgate is in the horizontal positon to hold the first link parallel with the second link.

In a further non-limiting embodiment of any of the foregoing tailgate assemblies, the second link includes a stop that limits movement of the track member relative to the second link.

In a further non-limiting embodiment of any of the foregoing tailgate assemblies, a control link that is attached to the first link and the second link to control relative movement between the first link and the second link.

In a further non-limiting embodiment of any of the foregoing tailgate assemblies, a control link is attached at a first end to the first link and to the second link at a second end, wherein the first link includes a slot and the first end of the control link includes a pin movable within the slot to limit rotation of the second link relative to the first link.

In a further non-limiting embodiment of any of the foregoing tailgate assemblies, the hinge assembly includes a stop for limiting movement of the first link relative to the horizontal position.

In a further non-limiting embodiment of any of the foregoing tailgate assemblies, a cable is attached between the tailgate and a static structure of the vehicle for holding the tailgate in the horizontal positon.

In a further non-limiting embodiment of any of the foregoing tailgate assemblies, a track assembly and a hinge assembly are disposed on both sides of the tailgate.

A tailgate assembly for a vehicle according to another exemplary aspect of the present disclosure includes, among other things, a tailgate, a track assembly including a first link attached to a second link at a link pivot and a track member slidable over the first link, the second link and the link pivot, wherein the tailgate is attached to the track member and the track member is slidable from the first link to the second link to enable movement of the second link relative to the first link about the link pivot, a control link attached at a first end to the first link and to the second link at a second end, wherein the first link includes a slot and the first end of the control link includes a pin movable within the slot to limit rotation of the second link relative to the first link and a hinge attached to a static structure of the vehicle and the first link of the track assembly at a hinge pivot such that the first link and the tailgate is movable about the hinge pivot between a closed position and a horizontal position and is further movable about the link pivot to a vertical open position.

In a further non-limiting embodiment of the foregoing tailgate assembly, the track member is slidable from a first position that secures the control link parallel to the first link to a second position that enables the control link to move to move relative to the first link.

In a further non-limiting embodiment of any of the foregoing tailgate assemblies, the track member includes a channel receiving the first link and the second link and a secondary channel receiving the control link.

In a further non-limiting embodiment of any of the foregoing tailgate assemblies, the second link includes a stop that limits movement of the track member relative to the second link.

In a further non-limiting embodiment of any of the foregoing tailgate assemblies, a lock assembly including a lock member that selectively couples the second link and the track member to limit movement of the tailgate along the second link.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 4 is a schematic view of an example hinge assembly.

FIG. 5 is a schematic view of the example hinge assembly with the tailgate in the closed position.

FIG. 6 is a schematic view of the example hinge assembly with the tailgate in the horizontal open position.

DETAILED DESCRIPTION

Figure 1:
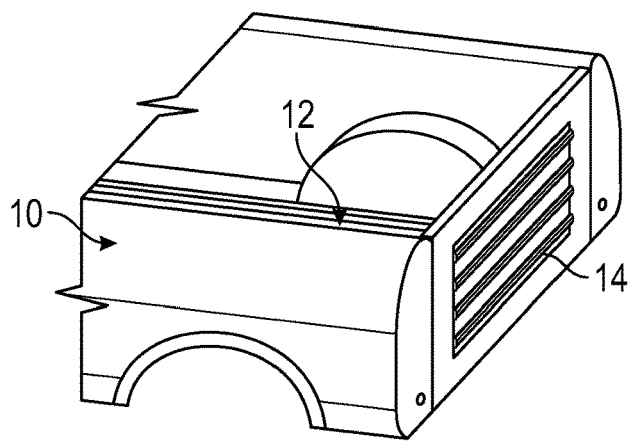
FIG. 1 is a perspective view of an example tailgate in a closed position.
Figure 2:
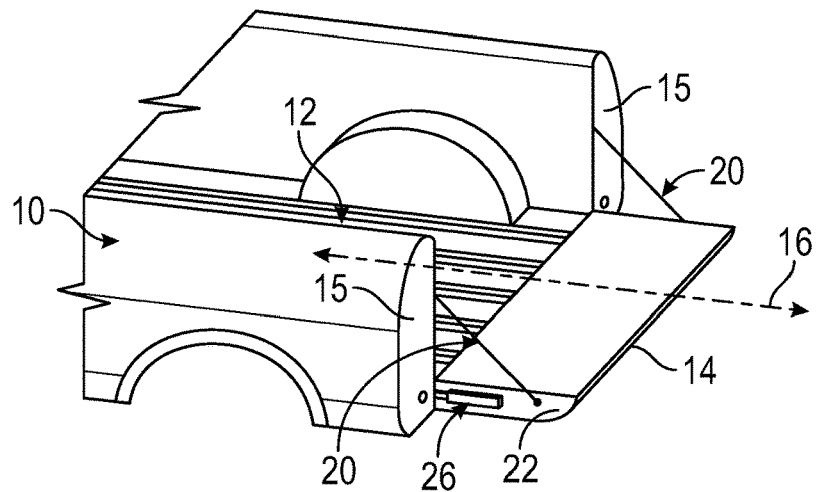
FIG. 2 is a perspective view of an example tailgate in a horizontal open position.
Figure 3:
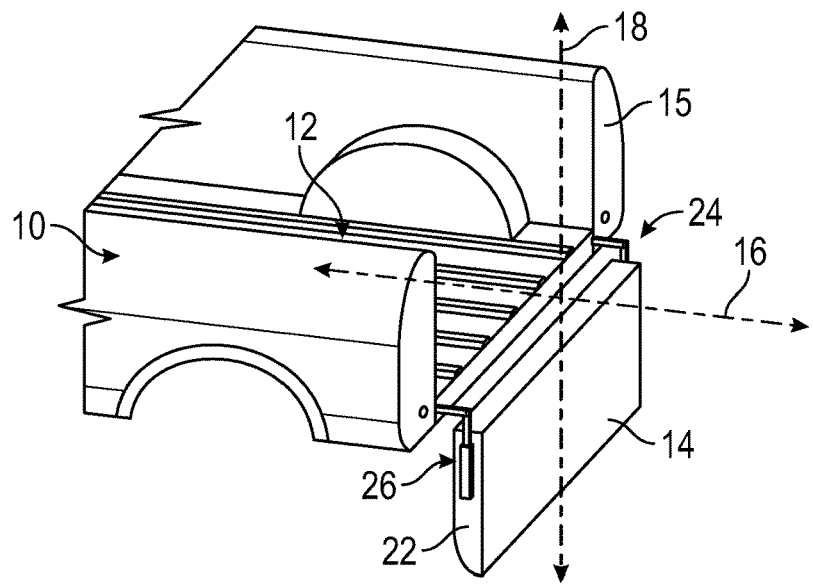
FIG. 3 is a perspective view of an example tailgate in a vertical open position.

Referring to FIGS. 1, 2 and 3, an example tailgate 14 is provided at a rear opening of a cargo bed 12 for a pickup truck 10. The tailgate 14 is rotatable 90 degrees from a closed position (FIG. 1) to a horizontal open position (FIG. 2) and an additional 90 degrees further to a vertical open position (FIG. 3). In the horizontal open position, the tailgate 14 extends outward from the rear opening of the cargo bed 12 along a horizontal plane 16 that is substantially even with a floor of the cargo bed 12. In the vertical open position, the tailgate 14 is pivoted downward 180 degrees from the closed position along a vertical plane 18. The vertical open position enables an operator of a vehicle to get closer to the rear opening to provide comfortable access to items within the cargo bed 12.

The tailgate 14 is secured to a static structure of the truck 10. In this example, the static structure is a D-pillar 15 near the rear opening of the cargo bed 12. The vertical open position enables an operator to reach further into the cargo bed 12 without the obstruction of the horizontally extending tailgate 14.

The tailgate 14 is secured to the D-pillar 15 with a hinge assembly 24. The hinge assembly 24 provides for movement of the tailgate 14 from the closed position to the horizontal open position shown in FIG. 2. Cables 20 and the hinge assembly 24 support the tailgate 14 when the horizontal open position. A track assembly 26 attached to the hinge assembly 24 and the tailgate 14 provides for movement of the tailgate from the horizontal open position to the vertical open position. It should be appreciated that although one side of the tailgate is shown in the disclosed drawings, that each side of the tailgate 14 includes a hinge assembly 4 and a track assembly.

Referring to FIGS. 4, 5 and 6 with continued reference to FIGS. 1, 2 and 3, the hinge assembly 24 includes a hinge block 28 that is secured to the D-pillar 15. The hinge block 28 includes a stop surface 30 and a hinge pivot 32. The hinge block 28 further includes openings 34 for fasteners 36 for securing to the D-pillar 15. The hinge block includes an upper portion 56 with the hinge pivot 32. The hinge pivot 32 is disposed along the horizontal plane 16 and spaced a distance 58 (FIG. 6) apart from the stop surface 30. The spacing 58 corresponds with a size of a first link 38 such that when moved to the horizontal open position the first link 38 rests on the stop surface 30.

The first link 38 is pivotally connected to the hinge block 28 at the hinge pivot 32. A pivot pin 40 is received within the opening defined by the hinge pivot 32. The first link 38 rotates from the closed position (FIG. 5) to the horizontal open position (FIG. 6) and rests on the stop surface 30 to hold the tailgate 14. Additionally, the cables 20 (FIG. 2) aid in supporting the tailgate 14 when in the horizontal open position. The track assembly 26 enables further rotation of the tailgate 14 to the vertical open position.

Figure 7:
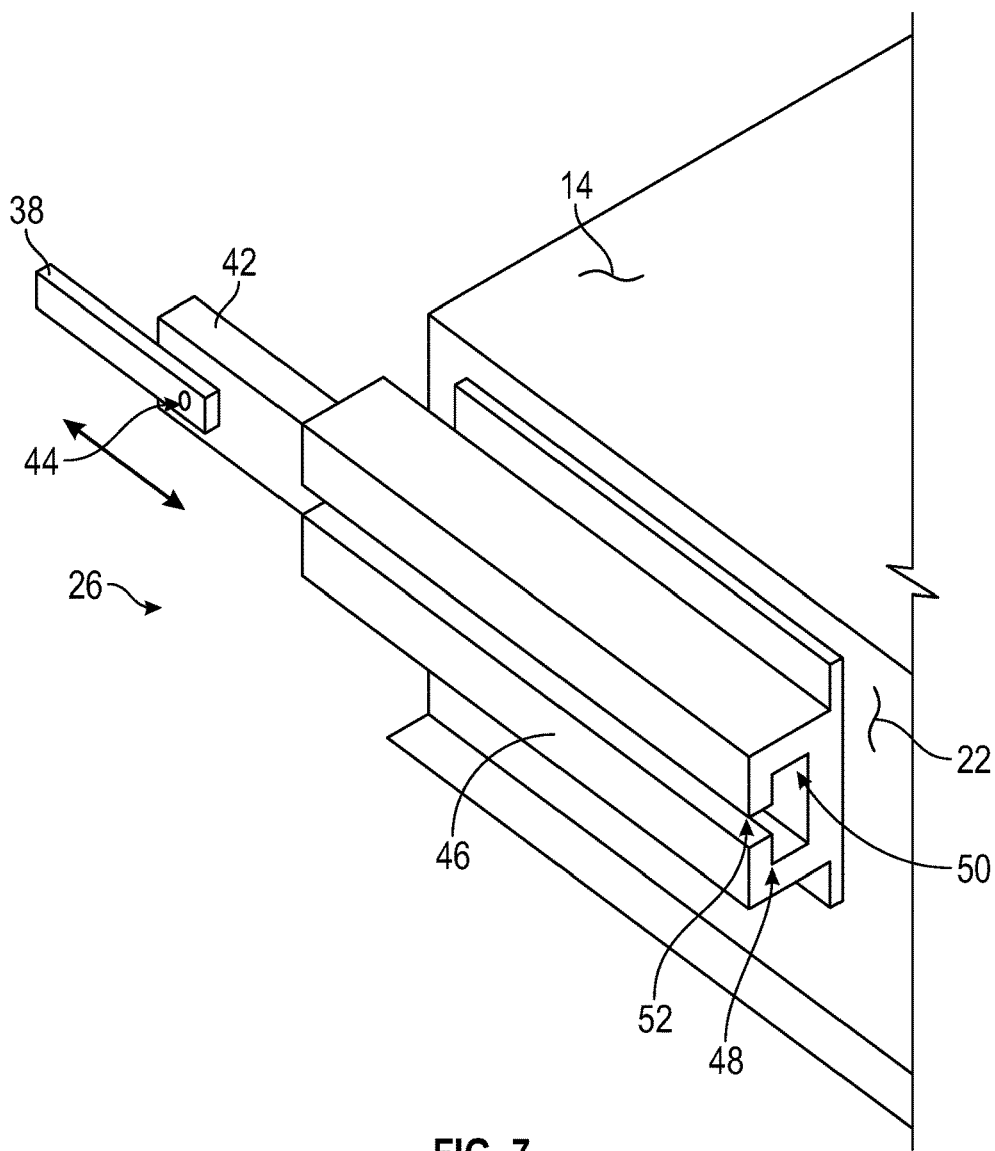
FIG. 7 is a perspective view of an example track assembly.
Figure 8:
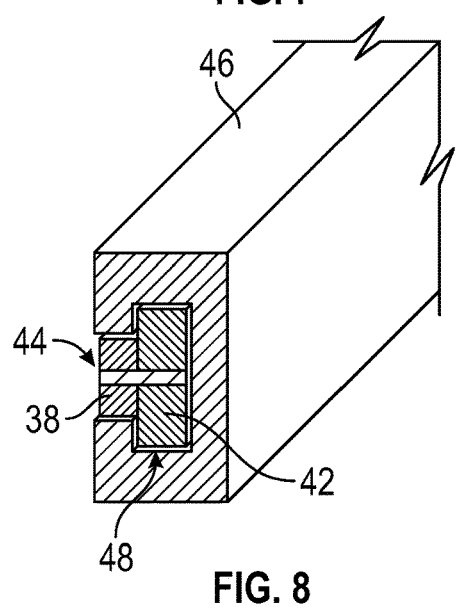

Referring to FIGS. 7 and 8, the example track assembly 26 includes the first link 38 that is pivotally attached to a second link 42 at a link pivot 44. The first link 38 and the second link 42 are both slidable into a track member 46. The track member 46 is attached to the sides 22 of the tailgate 14. The track member 46 is movable along the first link 38 and the second link 42 to selectively uncover the link pivot 44. The track member 46 includes a channel 48 that receives both the first link 38 and the second link 42. The channel 48 includes an inner portion 50 that receives the second link 42 and an outer portion 52 that receives the first link 38.

The track member 46 covers the pivot pin 44 when the tailgate 14 is in the horizontal open position to prevent rotation of the second link 42 relative to the first link 38. When the track member 46 covers the pivot pin 44, both the first link 38 and the second link 42 are disposed within the channel 48. As appreciated, when the first link 38 and the second link 42 are disposed within the channel 48, no relative rotation is possible.

Figure 9:
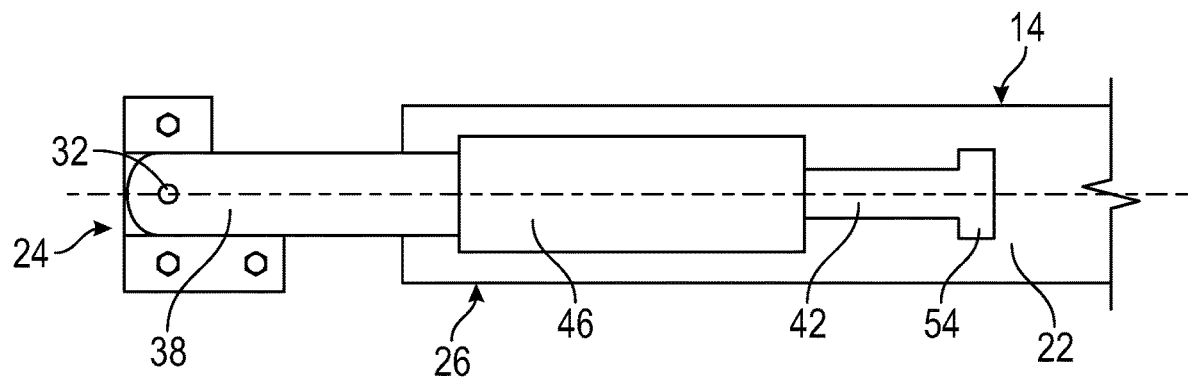
FIG. 9 is a schematic view of the example track assembly with the tailgate in the horizontal open position.
Figure 10:
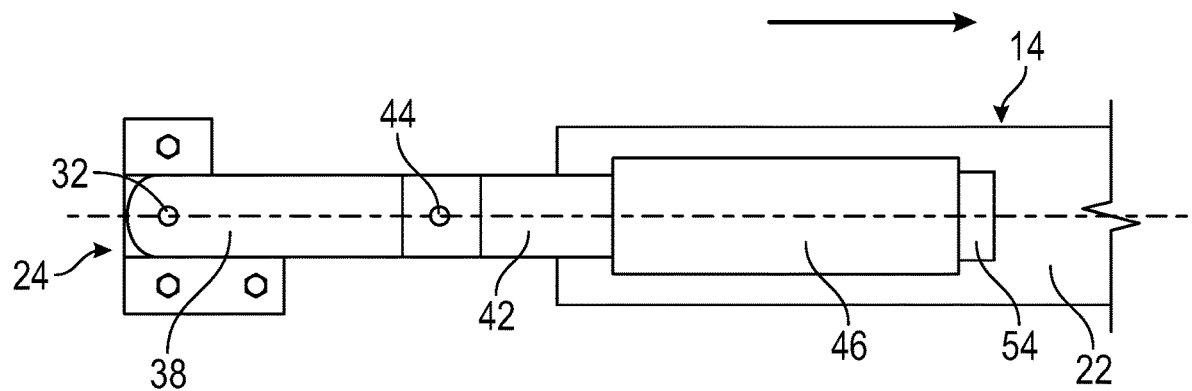
FIG. 10 is a schematic view of the example track assembly with the tailgate slide outward from horizontal open position.

Referring to FIGS. 9 and 10, sliding movement of the tailgate 14 and track member 46 along the first link 38 and the second link exposes the link pivot 44. Additionally, the first link 38 is released and the second link 42 is free to rotate about the pivot 44 relative to the first link 38.

Figure 11A:
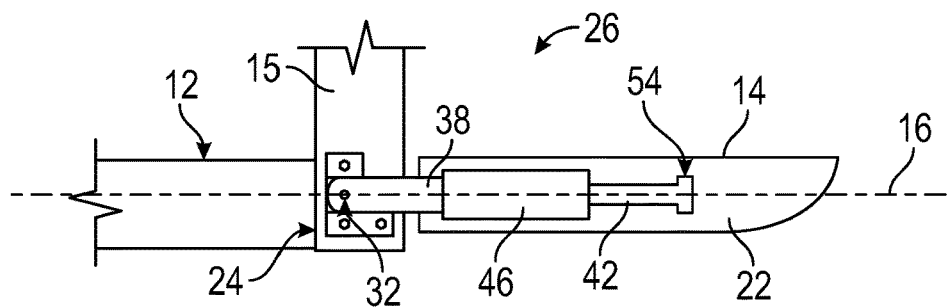
FIG. 11A is a schematic view of the tailgate and track assembly in the horizontal open position.
Figure 11B:
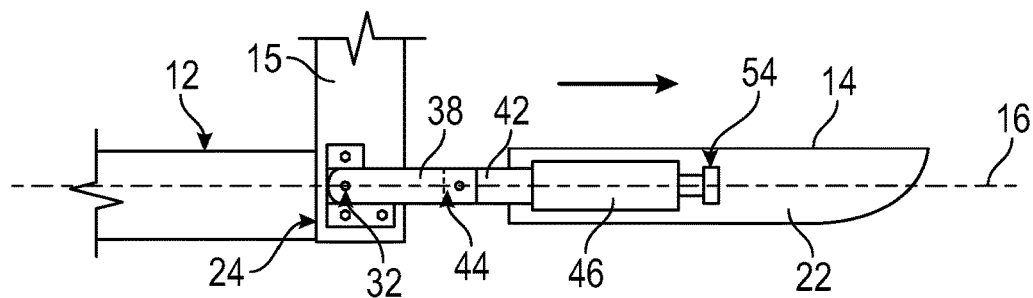
FIG. 11B is a schematic view of the tailgate and track assembly slide outward from the horizontal open position.
Figure 11C:
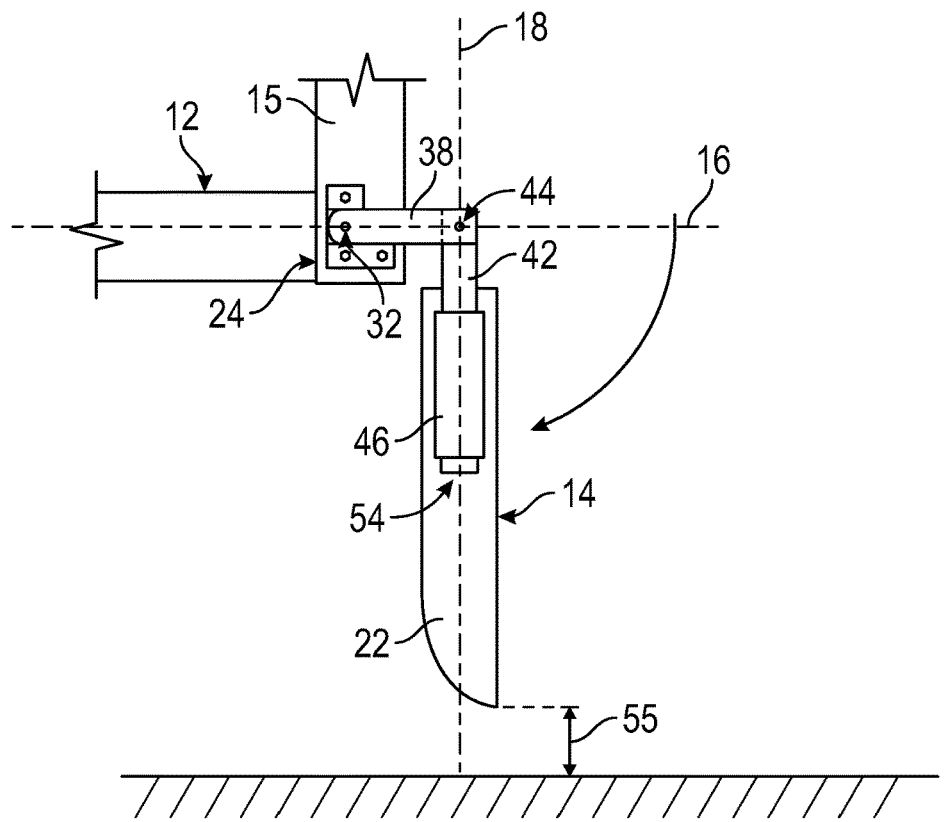
FIG. 11C is a schematic view of the tailgate and track assembly moved to a vertical open position.

Referring to FIGS. 11A-C, opening of the tailgate 14 to the vertical open position from the horizontal open position is schematically shown. FIG. 11A illustrates the tailgate in the horizontal open position. In the horizontal open position, the track member 46 covers the link pivot 44 and receives a portion of the first link 38. The channel 48 of the track member 46 holds the second link 42 in a horizontal position.

FIG. 11 B illustrates the tailgate 14 and track member 46 pulled outward along the horizontal plane 16. Outward movement of the track member 46 releases the first link 38 and the link pivot 44. A stop member 54 limits the sliding movement of the tailgate 14.

FIG. 11C illustrates rotation about the link pivot 44 to the vertical open position. The stop member 54 holds the tailgate 14 on the second link 42 a distance 55 above the ground or road surface. The vertical open position shown in FIG. 11C is a full 180 degrees from the closed position and allows an operator to be closer to the rear opening of the cargo bed 12 to access items.

Figure 12:
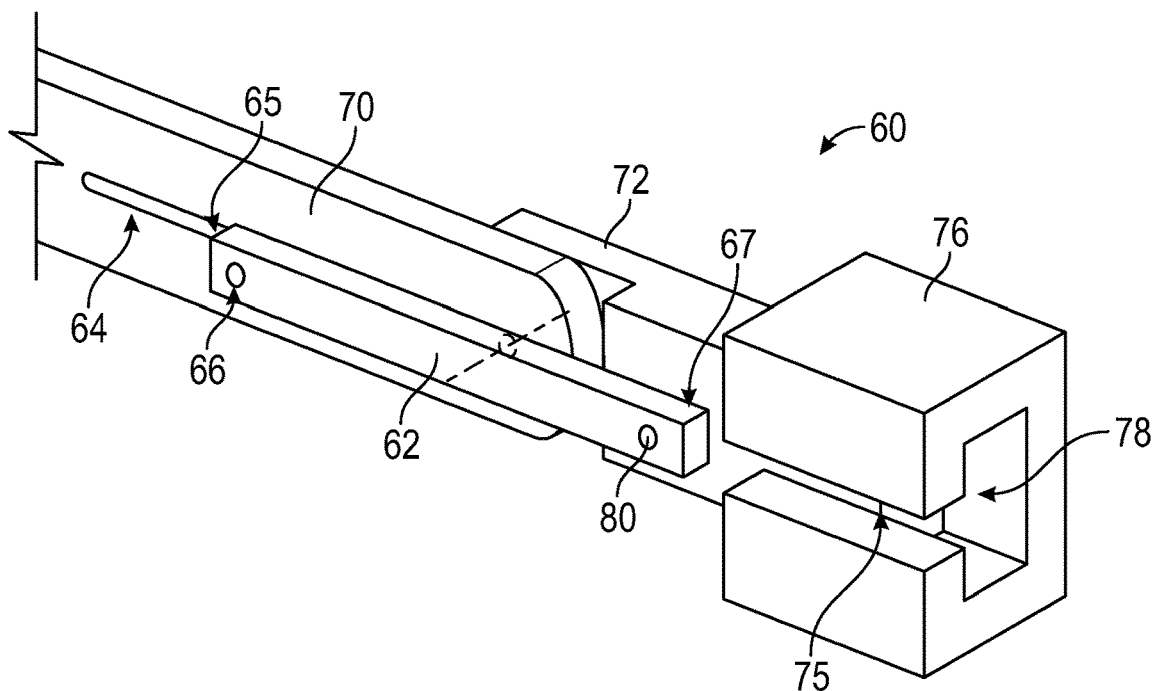
FIG. 12 is a perspective view of another example track assembly embodiment.
Figure 13:
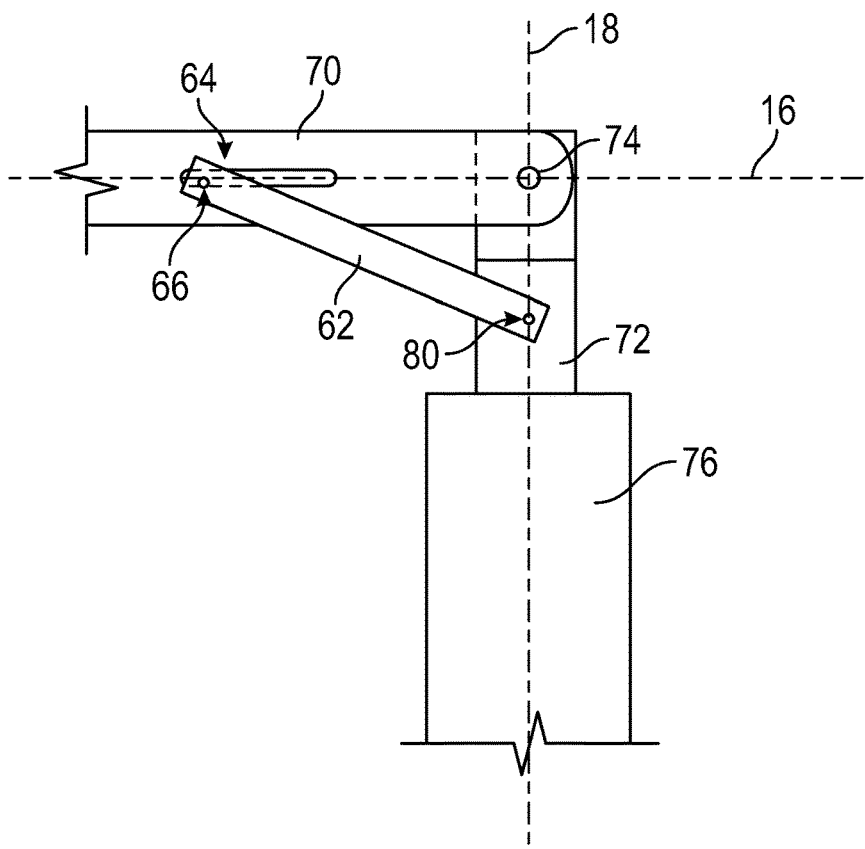
FIG. 13 is a schematic view of the example track assembly in a vertical open position.

Referring to FIGS. 12 and 13, another example track assembly embodiment is indicated at 60. The track assembly 60 includes a control link 62 that is attached at a first end 65 to a first link 70 and at a second end 67 to a second link 72. The control link 62 limits movement of the second link 72 relative to the first link to prevent opening of the tailgate 14 past the vertical plane 18. In this example, the first link 70 are both arranged to be received within a common channel 78 of the track member 76. The control link 62 is received within a secondary channel 75 defined within the track member 76. Accordingly, when the control link 62 is disposed within the secondary channel 75, the second link 72 is not able to rotate relative to the first link 70. Once the control link 62 is released from the secondary channel 75, the second link 72 may rotate.

The control link 62 includes a pivot pin 66 that is received within a control slot 64 defined on the first link 70. The control link 62 is attached to the second link 72 at a pivot 80. The control slot 64 is elongated and translational movement of the pivot pin 66 within the control slot 64 limit rotation of the second link 72 relative to the first link 70. In the horizontal positon, the pivot pin 66 is disposed at one end of the control slot 64. Upon rotation of the second link 72 relative to the first link about pivot 74, the pivot pin 66 moves to the other end of the control slot 64. Once the pivot pin 66 reaches the end of the control slot 64, rotational movement of the second link 72 is stopped.

Figure 14:
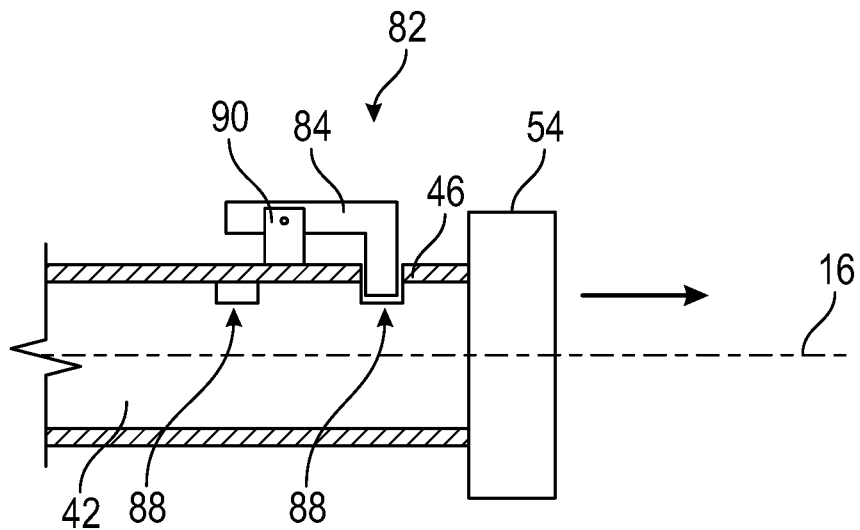
FIG. 14 is a schematic view of an example lock assembly in a locked position.
Figure 15:
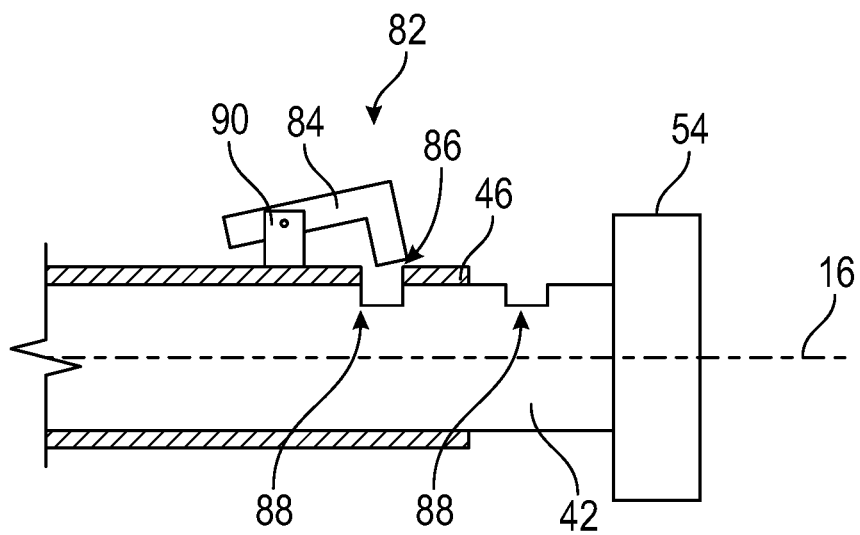
FIG. 15 is a schematic view of the example lock assembly in a released position.

Referring to FIGS. 14 and 15, a lock assembly 82 is schematically shown to hold the tailgate 14 in position within the horizontal plane 16. The lock assembly 82 holds the track member 46, and thereby the tailgate 14 in a position along the horizontal plane 16 to prevent unwanted horizontal sliding of the tailgate 14. The lock assembly 82 includes a lock member 84 that moves through an opening 86 within the track member 46 and into one of several openings 88 within the second link 42. The example lock member 84 is a lever that pivots on a support 90 attached to the track member 46. The openings 88 align with the opening 86 through the track member 46 to provide different horizontal position of the tailgate 14 relative to the second link 42. The openings 88 may be positioned to hold the tailgate 14 in a position within the horizontal plane 16. The openings 88 may also correspond with the extended position that enables rotation into the vertical open position.

The disclosed hinge assembly 24 and track assemblies 26, 60 enable opening of the tailgate from a closed position to a horizontal open position and further to a vertical open position to enable comfortable access to items within the cargo bed 12.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A tailgate assembly for a vehicle comprising:
   a tailgate;
   a track assembly including a first link attached to a second link at a link pivot and a track member slidable over the first link, the second link and the link pivot, wherein the tailgate is attached to the track member and the track member is slidable from the first link to the second link to enable movement of the second link relative to the first link about the link pivot; and
   a hinge attached to a static structure of the vehicle and the first link of the track assembly at a hinge pivot such that the first link and the tailgate is movable about the hinge pivot between a closed position and a horizontal position and further movable about the link pivot to a vertical open position.

2. The tailgate assembly as recited in claim 1, wherein the track member is slidable from a first position that secures the second link parallel to the first link to a second position that enables the second link to move to a vertical open position that is transverse to the first link.

3. The tailgate assembly as recited in claim 2, wherein the track member includes a channel and the first link and the second link are disposed within the channel.

4. The tailgate assembly as recited in claim 3, wherein the track member extends over the link pivot when the tailgate is in the horizontal positon to hold the first link parallel with the second link.

5. The tailgate assembly as recited in claim 2, wherein the second link includes a stop that limits movement of the track member relative to the second link.

6. The tailgate assembly as recited in claim 2, including a control link that is attached to the first link and the second link to control relative movement between the first link and the second link.

7. The tailgate assembly as recited in claim 6, wherein the control link is attached at a first end to the first link and to the second link at a second end, wherein the first link includes a slot and the first end of the control link includes a pin movable within the slot to limit rotation of the second link relative to the first link.

8. The tailgate assembly as recited in claim 1, wherein the hinge assembly includes a stop for limiting movement of the first link relative to the horizontal position.

9. The tailgate assembly as recited in claim 1, including a cable attached between the tailgate and a static structure of the vehicle for holding the tailgate in the horizontal positon.

10. The tailgate assembly as recited in claim 1, including a track assembly and a hinge assembly disposed on both sides of the tailgate.

11. A tailgate assembly for a vehicle comprising:
    a tailgate;
    a track assembly including a first link attached to a second link at a link pivot and a track member slidable over the first link, the second link and the link pivot, wherein the tailgate is attached to the track member and the track member is slidable from the first link to the second link to enable movement of the second link relative to the first link about the link pivot;
    a control link attached at a first end to the first link and to the second link at a second end, wherein the first link includes a slot and the first end of the control link includes a pin movable within the slot to limit rotation of the second link relative to the first link; and
    a hinge attached to a static structure of the vehicle and the first link of the track assembly at a hinge pivot such that the first link and the tailgate is movable about the hinge pivot between a closed position and a horizontal position and is further movable about the link pivot to a vertical open position.

12. The tailgate assembly as recited in claim 11, wherein the track member is slidable from a first position that secures the control link parallel to the first link to a second position that enables the control link to move to move relative to the first link.

13. The tailgate assembly as recited in claim 12, wherein the track member includes a channel receiving the first link and the second link and a secondary channel receiving the control link.

14. The tailgate assembly as recited in claim 13, wherein the second link includes a stop that limits movement of the track member relative to the second link.

15. The tailgate assembly as recited in claim 11, including a lock assembly including a lock member that selectively couples the second link and the track member to limit movement of the tailgate along the second link.

* * * * *